(12) United States Patent  
Elder

(10) Patent No.: US 9,381,452 B2  
(45) Date of Patent: Jul. 5, 2016

(54) COKE TOLERANT FUEL FILTER

(75) Inventor: James S. Elder, South Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1495 days.

(21) Appl. No.: 12/818,592

(22) Filed: Jun. 18, 2010

(65) Prior Publication Data

US 2011/0309013 A1 Dec. 22, 2011

(51) Int. Cl.
*B01D 35/28* (2006.01)
*B01D 29/03* (2006.01)
*F02C 7/22* (2006.01)

(52) U.S. Cl.
CPC . *B01D 29/03* (2013.01); *F02C 7/22* (2013.01); *B01D 2201/184* (2013.01)

(58) Field of Classification Search
CPC ................. B01D 39/10; B01J 2219/32244
USPC ........................... 210/456; 29/896.62
See application file for complete search history.

(56) References Cited

U.S. PATENT DOCUMENTS

| | | | |
|---|---|---|---|
| 3,940,237 A | 2/1976 | Gonzalez et al. | |
| 3,998,933 A | 12/1976 | Henderson, Jr. et al. | |
| 4,288,330 A * | 9/1981 | Strub | 210/777 |
| 4,362,022 A | 12/1982 | Faucher et al. | |
| 4,798,330 A | 1/1989 | Mancini et al. | |
| 4,854,861 A | 8/1989 | Hartweck et al. | |
| 5,052,482 A | 10/1991 | Gondouin | |
| 5,167,122 A | 12/1992 | Shekleton | |
| 5,203,892 A | 4/1993 | Brentrup et al. | |
| 5,829,246 A | 11/1998 | Abrams et al. | |
| 5,927,067 A | 7/1999 | Hanloser et al. | |
| 6,354,085 B1 | 3/2002 | Howell et al. | |
| 6,848,634 B1 | 2/2005 | Imochl | |
| 2010/0058589 A1 * | 3/2010 | Mirtsch et al. | 29/896.62 |

FOREIGN PATENT DOCUMENTS

WO WO2008077394 A2 * 7/2008 ............ B21D 13/04

OTHER PUBLICATIONS

UK search report received Nov. 14, 2011.

* cited by examiner

*Primary Examiner* — Bobby Ramdhanie
*Assistant Examiner* — Denise R Anderson

(57) ABSTRACT

A filter for use with a fuel system having contaminants has a plurality of apices and a plurality of ridges, where each ridge attaches an apex to an adjacent apex. A plurality of ridges and adjoining apices define a first opening that is in register with a second opening wherein the second opening has less surface area than the first opening. A side attaches the first opening and the second opening and tapers inwardly from the first opening to the second opening to minimize stagnant areas along the ridges and apices.

9 Claims, 4 Drawing Sheets

US 9,381,452 B2

COKE TOLERANT FUEL FILTER

BACKGROUND OF THE INVENTION

The subject matter disclosed herein relates to fuel filters.

Gas turbine engine fuel systems have a main filter and secondary filters that capture particulates that are generated downstream of the main engine filter. There may be openings that require secondary filtration downstream of the main filter for the optimal use and life of components fed by such smaller openings.

To prevent contaminants from entering the small clearances, last chance filters are installed in the fuel lines. These filters may be constructed of wire mesh or perforated sheet depending on installation and filter micron rating requirements.

Engine fuel systems may be used as a heat sink for heat generated by a gas turbine engine which has resulted in higher fuel temperatures.

SUMMARY OF THE INVENTION

According to an exemplar, a filter for use with a fuel system having contaminants has a plurality of apices and a plurality of ridges, where each ridge attaches an apex to an adjacent apex. A plurality of ridges and adjoining apices define a first opening that is in register with a second opening wherein the second opening has less surface area than the first opening. A side attaches the first opening and the second opening and tapers inwardly from the first opening to the second opening to minimize stagnant areas along the ridges and apices.

According to a further exemplar, a filter for use with a fuel system having contaminants has a plurality of apices, a plurality of ridges, each ridge attaching an apex to an adjacent apex wherein a plurality of ridges and adjoining apices define a first opening, a second opening in register with the first opening wherein the second opening has less surface area than the first opening, and a first side attaching the first opening and the second opening wherein the side tapers inwardly from the first opening to the second opening and wherein stagnant areas along the ridges and apices is minimized, a third opening in register with the second opening, a fourth opening defined by a plurality of apices and ridges and in register with the third opening wherein the third opening has less surface area than the fourth opening, and a second side attaching the third opening and the fourth opening wherein the second side tapers outwardly from the third opening to the fourth opening and wherein a coefficient of discharge of the filter is enhanced.

These and other features of the present invention can be best understood from the following specification and drawings, the following of which is a brief description.

DETAILED DESCRIPTION OF THE PREFERRED EMBODIMENT

Figure 1:
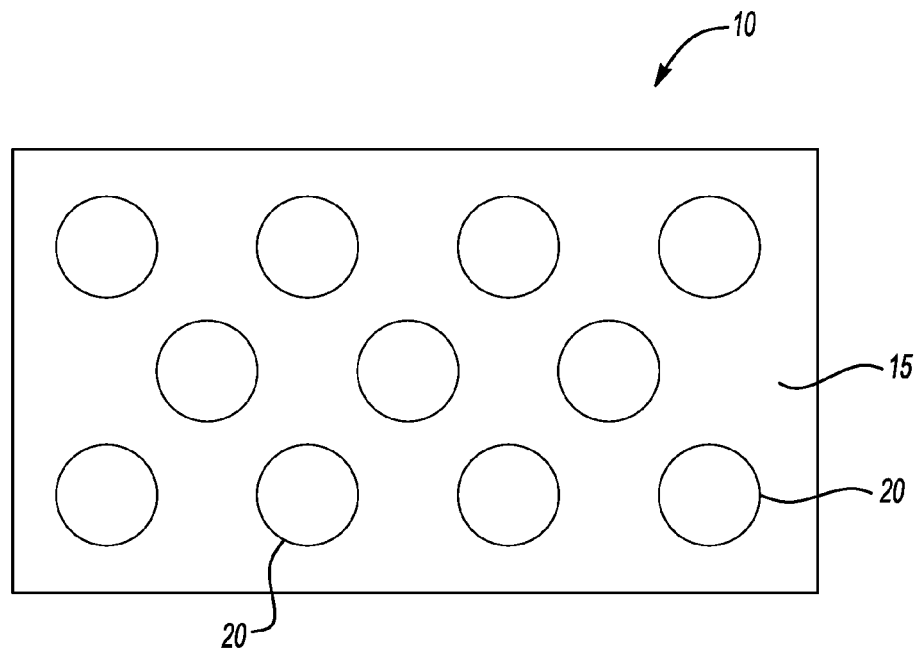
FIG. 1 shows a prior art fuel filter top view.

FIG. 1 shows a prior art view of a fuel filter 10. The fuel filter 10 has a body 15 and a plurality of symmetrically shaped holes 20 passing therethrough.

Figure 2:
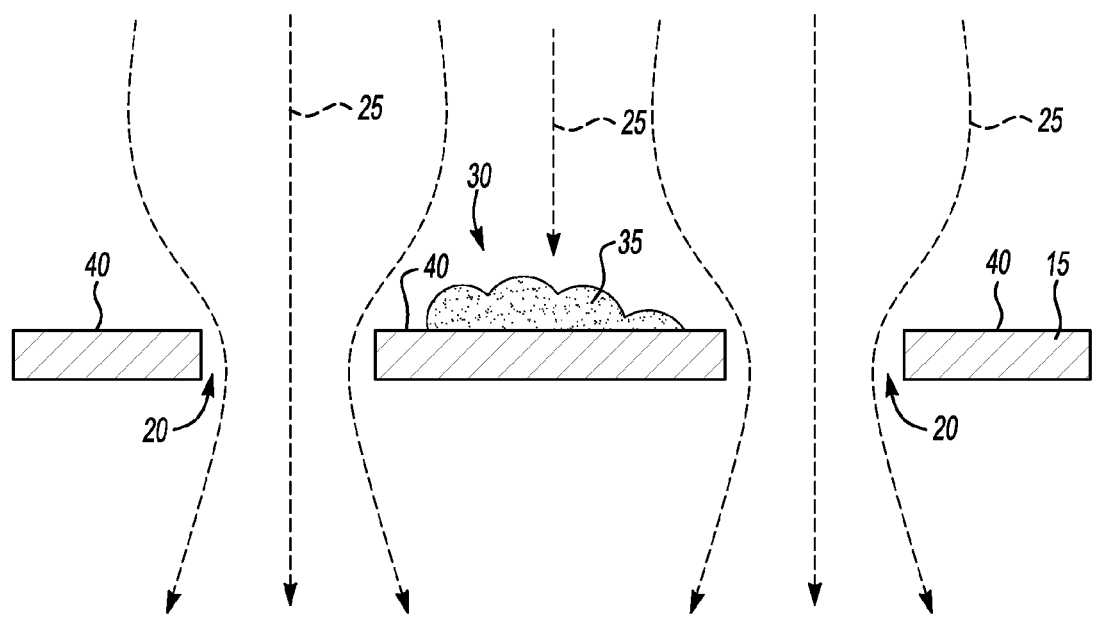
FIG. 2 shows a side view of the prior art filter of FIG. 1.

Referring to FIG. 2, problems of the filter of FIG. 1 are shown. As fuel flows (indicated by arrows 25) through the body 15, the fuel accelerates as it passes through the holes 20 but leaves stagnant areas 30 of lower velocity in which particulates, such as coke 35, that may be carried by the fuel and be deposited on surfaces 40 adjoining the holes 20. Coke is a particular problem in jet engines where higher temperatures therein tend to promote the growth of coke in fuel. If enough coke is allowed to form in the lower velocity area 30, the holes 20 may be forced closed and the engine or other components may not get the proper filtration of fuel flowing thereto and may suffer a reduced flow rate.

Figure 3:
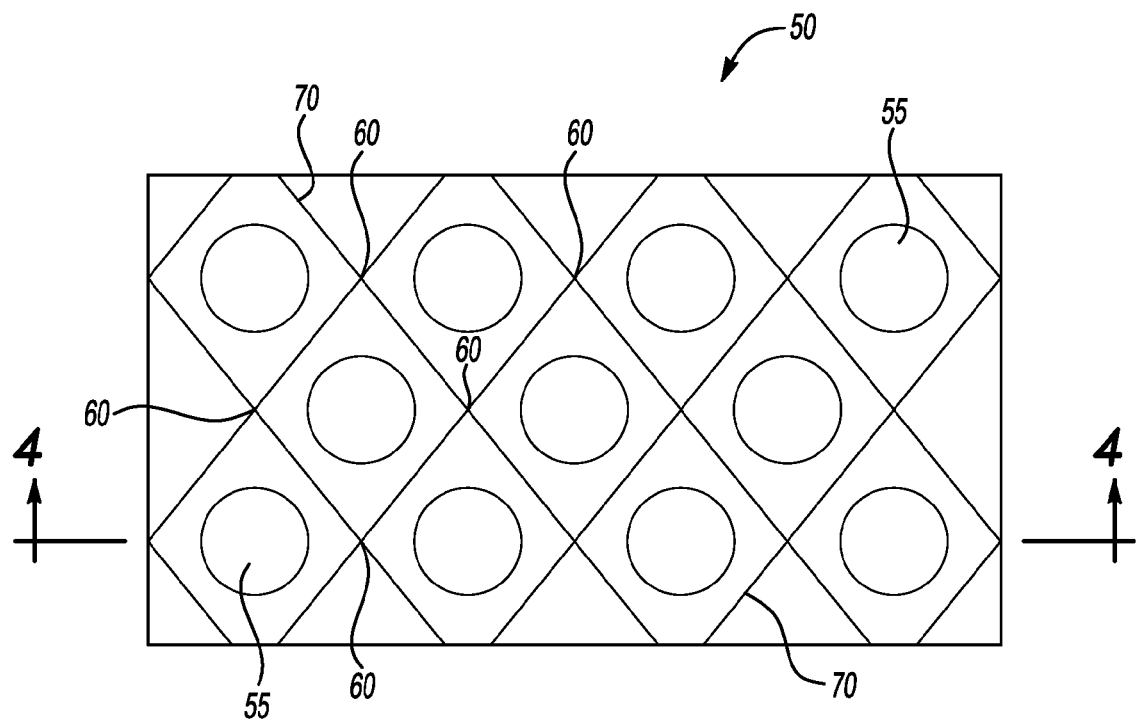
FIG. 3 shows a top view of an embodiment of a fuel filter disclosed herein.
Figure 4:
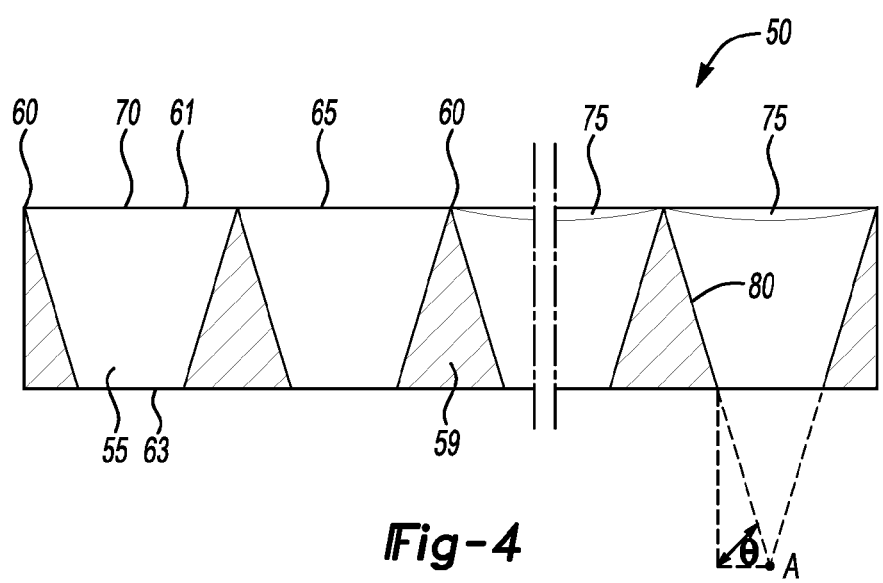
FIG. 4 shows a side view of the filter of FIG. 3 taken along the lines 4-4.
Figure 5:
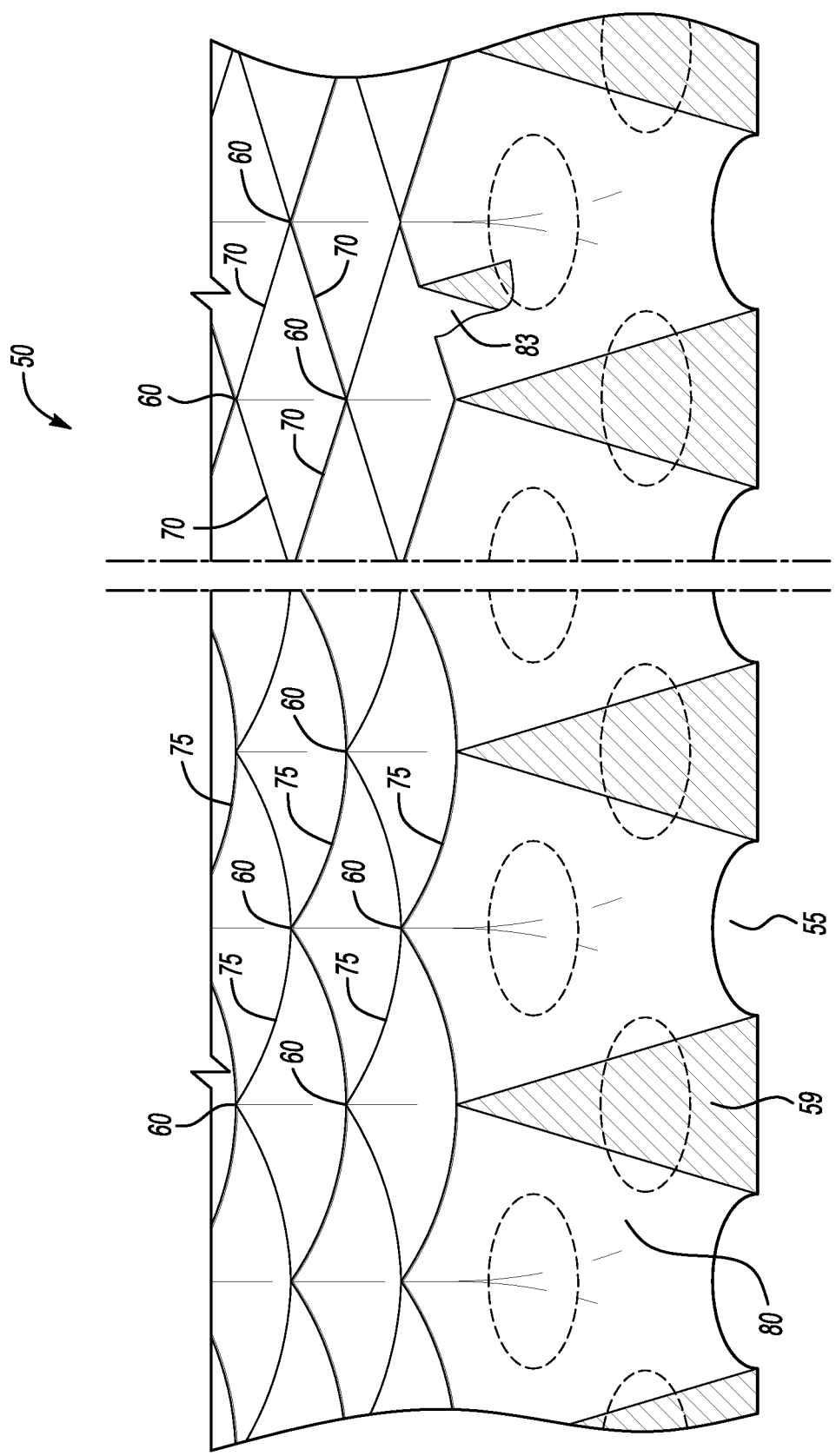
FIG. 5 shows a perspective view of the filter of FIGS. 3 and 4.

Referring now to FIGS. 3-5, an exemplar of a filter 50 is shown as a top view in FIG. 3, a side view in FIG. 4 and a perspective view in FIG. 5. The filter 50 includes a plurality of holes 55 passing through a body 59. Each hole 55 is bounded by a plurality of apices 60 that define a top plane 65 (see FIG. 4) of the body 59. Each apex 60 is connected by a ridge 70 to an adjacent apex 60. Each ridge 70 may be in the top plane 65 from apex 60 to apex 60 or it may be curved as ridge 75 (see FIG. 4 and FIG. 5). Though a top opening 61 of each hole 55 is bounded by four apices 60 and a bottom opening 63 of each hole 55 is circular, each hole 55 may be bounded by more or less apices 60 and the bottom opening 63 of each hole 55 may assume other shapes and such arrangement is contemplated as such herein. The top opening 61 of each hole 55 has more surface area than the bottom opening 63 of each hole 55 and the bottom opening 63 of each hole is downstream of the top opening 61 of each hole 55. Moreover, each ridge 70 or 75 may assume other shapes as long as an area formed by such ridge tends to minimize low velocity or stagnant areas to avoid depositing coke 35 thereupon.

Each side 80 (shown herein as continuous though other shapes are contemplated) of each hole 55 is slanted to taper inwardly towards an imaginary point A (see FIG. 4). Each side 80 is designed to be disposed at an angle θ from vertical. The angle θ may be disposed at a given angle so long as the angle minimizes low velocity areas as the fuel flows through the body 59 and depends on variables such as fuel flow, pressure, formula and temperature. The angle θ may be greater than 45 degrees to maximize the flow force to drive contamination from the sloped sides 80. If coke 35 accumulates on a side 80, then the flow force may cause the coke 35 to fracture due to its brittle nature and pass through the filter 50.

The body 90 has a plurality of holes 100 having a top opening 105 that minors and is in registration with a bottom opening 63 of hole 55 and a bottom opening 110 that mirrors a top opening 61 of hole 55. The hole 100 has sides 115 that taper outwardly from the top opening 105 to the bottom opening 110 thereof. The top opening 105 of the hole 100 has less surface area than the bottom opening 110 of the hole 100 and the top opening 105 and the bottom opening 110 of the hole 100 are in register with each other.

As the fuel flows through the body 59 along the slanted sides 80, the fuel tends to scour the sides 80 and keep them clean of coke 35 deposits. Coke 35 formation on the sides 80 that might clog the holes 55 is minimized.

The geometry of the body 59 taken as a cross-section from apex 60 to apex 60 as shown in FIG. 5 or to each ridge 70, 75 is basically triangular though other shapes are contemplated herein. Such triangular shape is also shown at cutaway 83 of FIG. 5.

Figure 6:
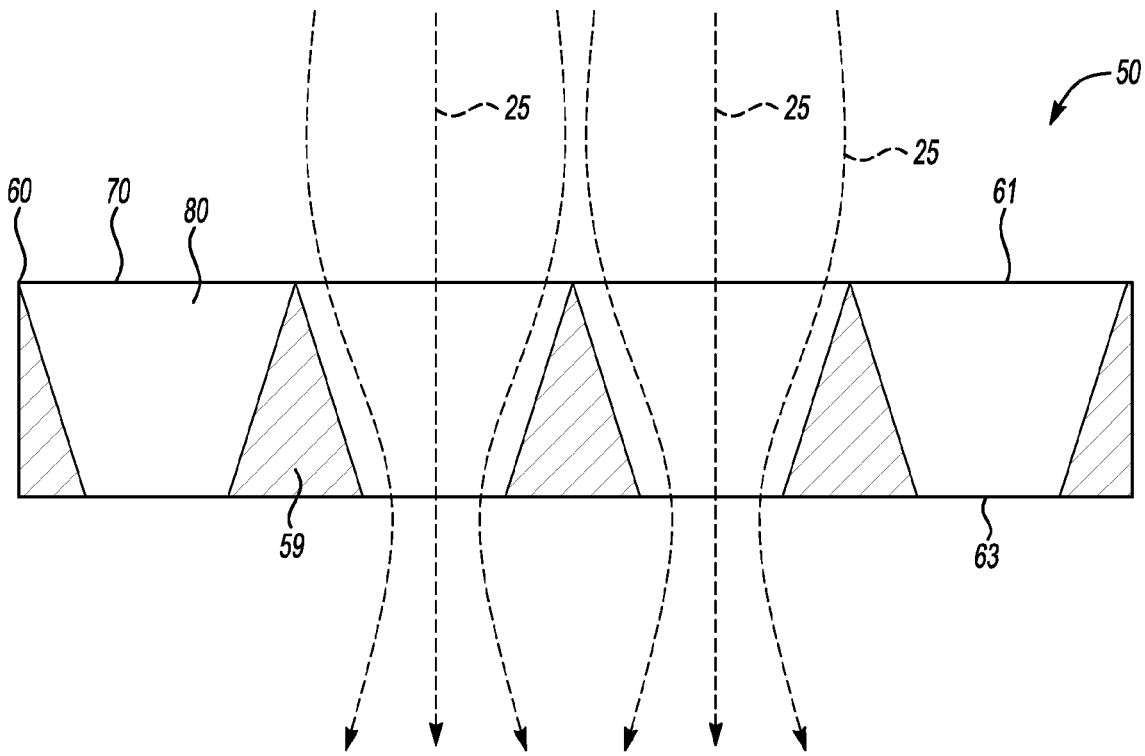
FIG. 6 shows a side schematic view of fuel flowing through the filter of FIG. 5.

Referring now to FIG. 6, the flow of fuel 25 through the filter 50 is shown in cross-section. As the fuel 25 flows through the filter body 59, it scours the sides 80 to remove any particulates that are supposed to pass through the filter. The low velocity area 30 (see FIG. 2) is minimized by the shape of each apex 60, and the ridges 70, 75, so that coke 35 formulation is also minimized.

Figure 7:
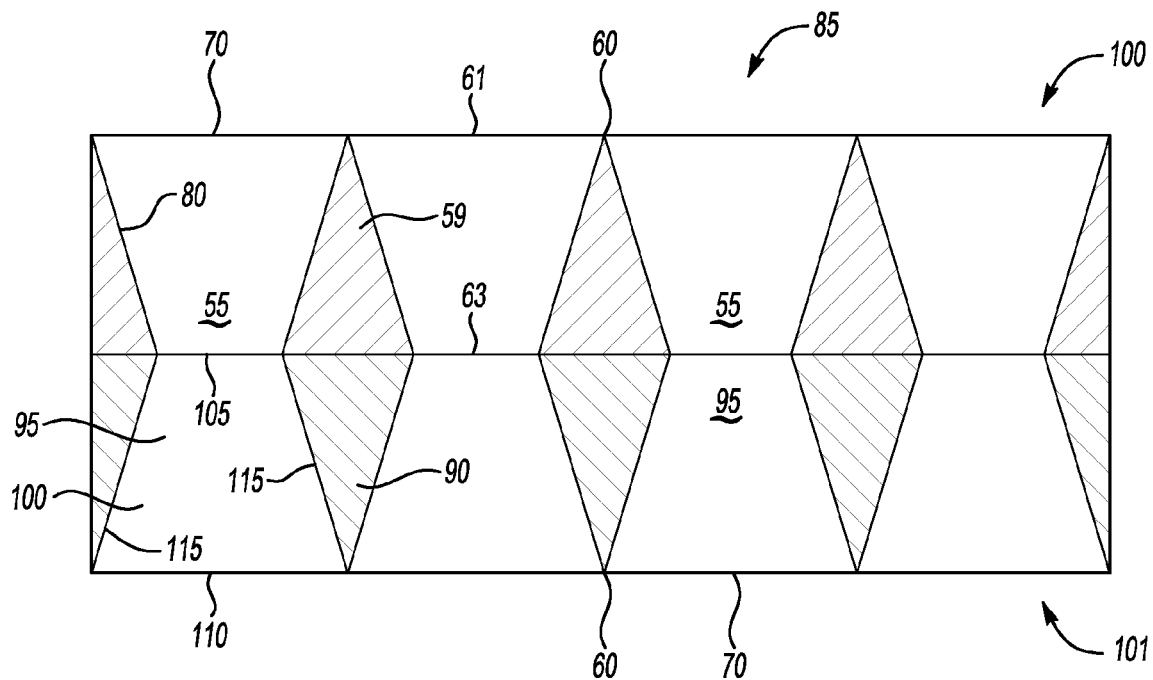
FIG. 7 shows an embodiment of the fuel filter of FIG. 3.

Referring now to FIG. 7, an alternative embodiment is shown as filter 85. A second body 90, which is a mirror image of the body 59 of the filter 50, is connected to a body 59 so that the holes 95 of the second body 90 align with the holes 55 and form an hour glass or a mirrored shape 101. As is clear, the flow path for fuel passing through the filter 85 moves from a first opening in a surface 61, tapers inwardly to the opening 63 at the opposed end of the body 59, enters the opening 95 in the second body, and then tapers back outwardly to opening 110.

By providing a mirrored shape 101 passing from the body 59 into the second body 90, the pressure drop of the fuel passing through the filter 85 is minimized The coefficient of discharge ("Cd") for the filter shown as prior art in FIG. 1 is about 0.65. The discharge coefficient for the embodiment of filter 50 shown in FIG. 6 is greater than about 0.7. And the discharge coefficient for the embodiment of filter 85 shown in FIG. 7 is about 0.85. The coefficient of discharge is the ratio of the mass flow rate at the discharge end of the nozzle to that of an ideal nozzle which expands an identical working fluid from the same initial conditions to the same exit pressure. A perfect discharge coefficient would be 1.0 where there is no change in exit pressure to minimize changes in the fuel. Other shapes that increase the Cd are contemplated herein.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A filter for use with a fuel system having contaminants therein, said filter comprising:
    a plurality of apices;
    a plurality of ridges, each ridge attaching an apex to an adjacent apex wherein a plurality of ridges and adjoining apices define a first opening;
    a second opening in register with said first opening wherein said second opening has less surface area than said first opening;
    a first side attaching said first opening and said second opening wherein said first side tapers inwardly from said first opening to said second opening;
    a third opening in register with said second opening;
    a fourth opening defined by a second plurality of apices and ridges and in register with said third opening wherein said third opening has less surface area than said fourth opening;
    a second side attaching said third opening and said fourth opening wherein said second side tapers outwardly from said third opening to said fourth opening; and
    a flow passage from said first opening to said second opening decreasing in cross-sectional area, then moves through said third opening, and increases in cross-sectional area until reaching said fourth opening.

2. The filter of claim 1 wherein at least one of said plurality of ridges forms a straight line passing from an apex to an adjacent apex.

3. The filter of claim 1 wherein at least one of said plurality of ridges forms a contoured line passing from an apex to an adjacent apex.

4. The filter of claim 3 wherein said contoured line is curved.

5. The filter of claim 1 wherein four apices define said first opening and said second opening forms a circle.

6. The filter of claim 1 wherein said first and second openings are minor images of said third and fourth openings.

7. The filter of claim 1 wherein said first side tapers inwardly at an angle greater than 45°.

8. The filter of claim 1, wherein said apices and said ridges together lie in a common plane.

9. The filter of claim 1, wherein said flowpath generally defines an hourglass shape.

* * * * *